June 19, 1956 J. R. PIERCE 2,751,518

FREQUENCY STABILIZED OSCILLATOR

Filed Oct. 1, 1953

INVENTOR
J. R. PIERCE
BY Hugh S. Wertz
ATTORNEY

United States Patent Office 2,751,518
Patented June 19, 1956

2,751,518

FREQUENCY STABILIZED OSCILLATOR

John R. Pierce, Berkeley Heights, N. J., assignor to Bell Telephone Laboratories, Incorporated, New York, N. Y., a corporation of New York Application October 1, 1953, Serial No. 383,620
6 Claims. (Cl. 315—3.5)

Figure 1:
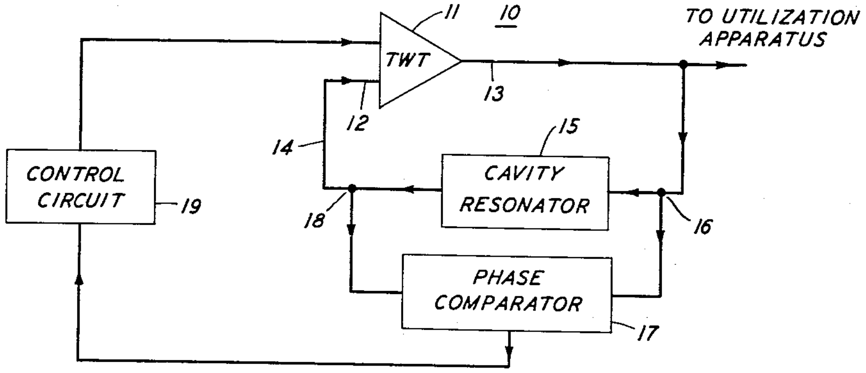

This invention relates to frequency stabilized oscillators for use at microwave frequencies.

An object of the invention is to provide an improved form of microwave frequency stabilized oscillator.

Various oscillator arrangements have been proposed hitherto which employ cavity resonators for frequency stability. In one common form of microwave oscillator, its resonant circuit consists of an internal cavity resonator which forms an integral part of the oscillator tube. However, for use in such an oscillator, it is impractical to employ a cavity resonator of the highest Q or the maximum frequency stability obtainable because of the requirements imposed on this use as the tank circuit of the tube. To remedy this shortcoming various schemes have been suggested which utilize an additional external cavity resonator distinct from the oscillator tube to control the frequency of such an oscillator. Of these, a direct approach is to couple the external cavity to the oscillator in such a way that the external cavity appears to be the tank circuit of the tube. Another approach utilizes an external cavity resonator in a microwave control circuit which is loosely coupled to the oscillator and develops a voltage which is a measure of the difference between the frequency of the oscillator and the resonant frequency of the cavity. This voltage is utilized to modify the voltage of a control element of the oscillator in a way to reduce this difference frequency. However, both these last described approaches are relatively complex and oscillators stabilized in accordance with such principles may still oscillate initially at frequencies outside the pass band of the external cavity.

As distinguished from such prior art, in an oscillator in accordance with the invention a microwave amplifying element is provided with an external regenerative feedback wave energy path from its output connection to its input connection to form a closed loop. In this loop there are set up oscillations at frequencies at which the usual necessary conditions for oscillations prevail. Oscillatory energy is abstracted for use by utilization apparatus by way of a coupled connection to the feedback path. Additionally, for frequency stability, a high-Q cavity resonator is inserted serially in the feedback path and the phase shift in the oscillatory wave in propagating through this cavity resonator is utilized to set up a voltage which is supplied to a control element in the oscillatory loop to vary the frequency of oscillations in a direction to minimize this phase shift. To this end, use is made of the characteristic that this phase shift will be a minimum for an oscillatory wave of the frequency at which the cavity is resonant. The principles of the invention have special application to arrangements which utilize as the amplifying element a traveling wave tube which is a device which utilizes the interaction between a traveling electromagnetic wave propagating along a slow wave guiding path and an electron beam flowing therepast to provide amplification to the traveling wave. In such arrangements, the slow wave guiding path of the tube forms a portion of the oscillatory loop and the oscillatory frequency of the loop is readily modified by varying the electrical length of this path. In such tubes, this can be done electrically by varying the applied voltage accelerating the beam. Moreover, in oscillator arrangements of this last kind it is a simple matter to provide that the gain condition for oscillations in the oscillatory loop is never satisfied at frequencies outside the pass band of the high-Q cavity resonator which forms a series portion of the oscillatory loop.

Figure 2:
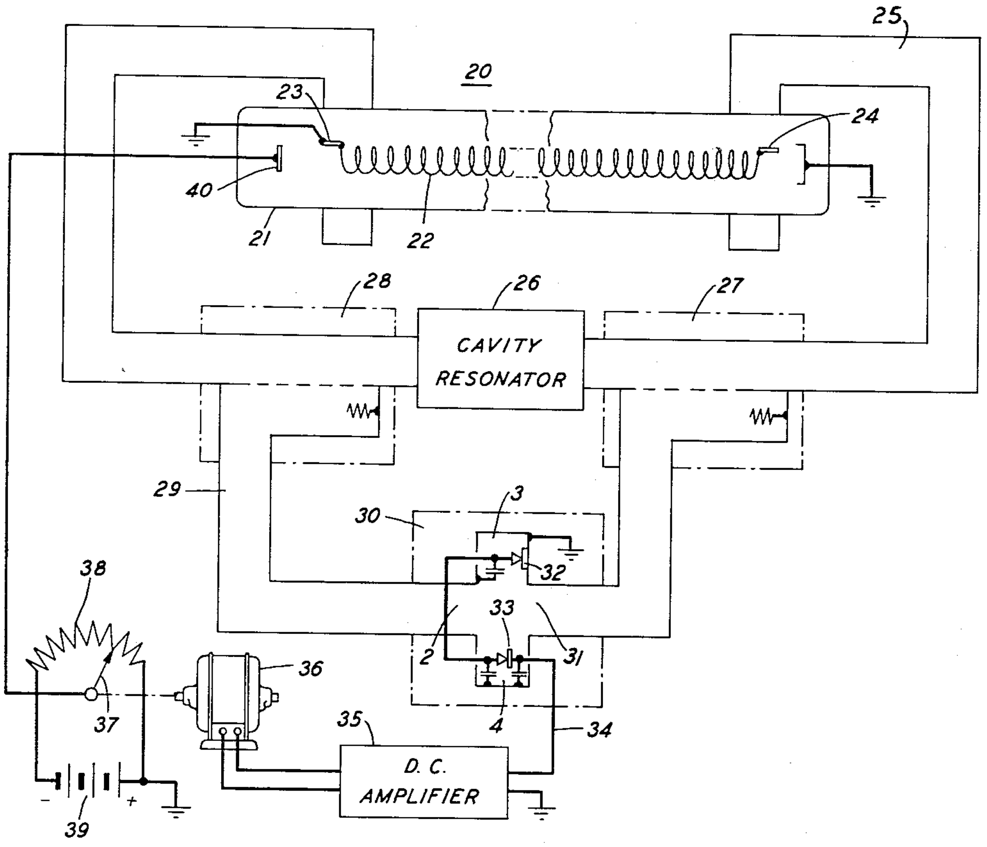

The invention will be better understood from the following more detailed description taken in conjunction with the accompanying drawings in which:

Fig. 1 shows in block schematic form a frequency stabilized oscillator in accordance with the invention; and Fig. 2 shows in greater detail a preferred embodiment of the invention.

Referring more particularly to the drawings, in the oscillator 10 shown in Fig. 1, a radio frequency amplifier 11 having input and output terminals 12 and 13, respectively, is provided with an external regenerative feedback path 14 therebetween. The wave guiding path in the amplifier and the feedback path form a closed loop. As is well known, such a closed loop will oscillate at frequencies at which the electrical length around the loop is an integral number of wavelengths and the gain therearound is initially greater than unity. Serially connected in this feedback path and forming a part of the closed loop is the cavity resonator 15. The cavity resonator is adjusted to have a resonant frequency which is identical with that at which the oscillator frequency is to be stabilized. A junction 16 leading off to a branch path is inserted in the feedback path between the output terminal of the amplifier 11 and the input connection to the resonant cavity to provide as one input to a phase comparator 17 a sample of the oscillatory wave energy in the loop being applied as an input to the cavity resonator 15. Similarly, a junction 18 leading off to a branch path is inserted in the feedback path between the output connection of the cavity resonator and the input terminal of the amplifier 11 to sample for use as another input of the phase comparator 17, the oscillatory wave energy in the loop after traversal of the cavity resonator. The phase comparator 17 compares the phases of the two samples applied as inputs thereto for deriving a measure of the phase shift introduced to the oscillatory wave energy by the cavity resonator. A difference in the frequency of the oscillatory wave energy and the resonant frequency of the resonator will result in a shift in the phase of the oscillatory wave energy in its traversal of the cavity, and this shift is detected by the phase comparator which develops a control voltage proportionate thereto. This control voltage is used to vary the oscillatory frequency of the closed loop whereby the difference between the oscillatory frequency and the resonant frequency of the resonator is reduced. To this end, the voltage developed by the phase comparator is applied to the amplifier 11 by a servo path 19 whereby there are varied the characteristics of that portion of the oscillatory loop formed by the amplifier and the oscillatory frequency is stabilized.

It can be seen that this arrangement has certain advantages over prior art arrangements. In particular, by making the cavity resonator 15 a link in the regenerative feedback path 14, it is insured that any oscillations in the closed loop be at frequencies in the pass band of the resonant cavity since at frequencies outside this pass band it will be impossible to meet the gain condition for oscillations. Moreover, by making the resonant cavity which serves as the frequency standard external to and independent of the amplifying element, fewer restrictions are imposed on the choice of the resonant cavity. In particular, a cavity having an unloaded Q of many thousands of the type used in frequency standards can be utilized. Additionally, temperature compensation through the use of materials having different thermal coefficients of expansion allows such cavities to be temperature independent. Alternatively, since the cavities for microwave frequencies can be small, independence of the resonant frequency from the ambient temperature can be obtained by the use of a temperature-regulated oven. For example, by the use of a silver-plated invar cavity with steps taken to control its temperature to within a degree centigrade, resonant frequency changes due to temperature can be made less than one part in a million. Moreover, to obtain independence from changes of the atmospheric dielectric constant, the cavity may be hermetically sealed. As still another advantage, it should be possible to tune such cavities over a relatively wide tuning range by a simple mechanical adjustment.

The degree of control which can be achieved ideally by an arrangement of the kind described is given by $$\frac{\Delta f}{f}=\frac{1}{2}\frac{\Delta\theta}{Q}$$

where $\Delta f$ is the frequency deviation of the oscillations, $f$ is the resonant frequency of the cavity, $\Delta\theta$ is the phase shift in radians to which the oscillatory wave can be held in passing through the cavity, and Q is that of the cavity. If the phase comparison circuit and the servo control system is such as to keep $\Delta\theta$ below .02 radian, for a Q of 10,000, stability of one part in a million will be possible.

From the foregoing considerations, it can be seen that good stability is dependent on the degree of balance that can be obtained and maintained in the phase comparator. This in turn is dependent upon the stable gain of the servo system and the speed of control possible. This latter factor is largely determined by the nature of the oscillatory loop and the means utilized to vary its oscillatory frequency. In particular, it is advantageous to utilize the servo control to vary a parameter of the amplifying element which forms part of the oscillatory loop.

Fig. 2 shows by way of example a specific form of frequency stabilized oscillator 20 in accordance with the invention. A helix-type traveling wave tube 21 of the kind well known to workers in the microwave art serves as the amplifying element. Such a tube comprises basically a helical conductor 22 which serves as the interaction circuit for propagating a slow traveling wave and means 40 for forming an electron beam which is projected past the interaction circuit. Transducers 23, 24 at the two ends of the interaction circuit are employed to introduce a wave from an external transmission path as an input to one end and to abstract from the other end the output for continuation along an external transmission path. It is characteristic of such a traveling wave tube that the electrical length of the wave path in the tube is to a large degree determined by the velocity of the electron beam past the interaction circuit, which velocity can readily be controlled by the beam voltage applied on the helical conductor 22. Accordingly, a traveling wave tube amplifier of this kind is well adapted for use as the amplifying element which serves as the variable element in the oscillatory loop in the practice of the invention.

A hollow wave guide 25 of rectangular cross section serves as the transmission path interconnecting the various elements forming the oscillatory loop. Serially interconnected in the oscillatory loop is a high-Q resonator 26 which is tuned to resonate at the frequency at which the oscillator is to be stabilized. Measures of the kind described above may be taken to minimize any drift in the resonant frequency of the cavity. Directional couplers 27 and 28 are used to abstract for use in the control branch path 29 oscillatory wave energy from the oscillatory loop at regions preliminary and subsequent to, respectively, passage through the cavity. The use of directional couplers in this way permits the abstraction into the control path of power from the oscillatory loop with minimum disturbance of the oscillatory loop. The directional couplers supply the abstracted wave samples to a microwave phase comparator 30. This comparator comprises a hybrid junction 31 of the kind now known in the art as a "magic-tee" which includes four arms. It is characteristic of such a hybrid junction that it can be operated so that at arm 3 there results a measure of the sum of the two inputs at arms 1 and 2 and at arm 4 there results a measure of the difference in these two inputs. The samples abstracted by directional couplers 27 and 28 are applied to arms 1 and 2 of the hybrid junction. In forming a phase comparator, matched crystals 32 and 33 are positioned in the two arms 3 and 4 of the hybrid junction and the D.-C. voltages developed thereacross are arranged to be in series opposition in the control circuit 34. The directional couplers 27 and 28 are positioned relative to one another along the oscillatory loop and the lengths of the branch paths therefrom to the arms 1 and 2 of the hybrid junction or chosen to provide wave inputs thereto which are equal in magnitude but have a phase difference therebetween of $\pi/2$ radians when the oscillatory loop is oscillating at the resonant frequency of the cavity. For increased simplicity in achieving these conditions it is sometimes advantageous to insert a variable phase shifter and attenuator (not shown here) in the branch path between directional coupler 27 and arm 1 of the hybrid junction 31. At times when the inputs to arms 1 and 2 meet these balance conditions, equal voltages will be developed by the two crystals which voltages will cancel one another in the control circuit 34. At times when the oscillatory frequency of the loop deviates from the resonant frequency of the cavity, there will result an unbalance in the two voltages developed by the crystals 32 and 33 establishing in the control circuit 34 a net voltage whose polarity will be a measure of the sign of the frequency deviation. For use in controlling the beam voltage acting on the traveling wave tube, it becomes necessary to raise the level of the control voltage provided by the crystals. To this end the control voltage derived is supplied as an input to a D.-C. amplifier 35 where the level is raised. The output of this D.-C. amplifier is used in turn to drive a motor 36 which shifts the setting of the tap 37 of the potentiometer 38 connected across the voltage supply 39. The voltage tapped off is used to establish a potential difference between the electron source 40 and the helical conductor 22 of the traveling wave tube which determines the beam velocity. The motor 36 is reversible and the direction of drive is dependent on the polarity of the control voltage developed by the control circuit 34 in each case the direction of drive being such as to vary the beam voltage in a way to decrease the frequency deviation giving rise to the control voltage.

It is to be understood that this specific embodiment described is merely illustrative of the general principles of the invention. Various other arrangements can be devised by one skilled in the art without departing from the spirit and scope of the invention.

In particular, various forms of amplifying elements are suitable including other forms of traveling wave tubes. However, in accordance with a preferred embodiment of the invention it is advantageous to employ as the amplifying element one whose electrical length can readily be changed by a control voltage derived from any deviation of the oscillatory frequency from the cavity resonant frequency whereby the oscillatory frequency can be varied to reduce this deviation. However, it is, of course, feasible to employ the control voltage derived from any frequency deviation to vary the electrical length of some other portion of the oscillatory loop to the same end. For example, in copending application Serial No. 383,619, filed October 1, 1953 by D. H. Ring there is described an oscillator in which a variable phase shifter is inserted in the oscillatory loop and the control voltage is utilized to vary the setting of this phase shifter.

Moreover, various other arrangements can be employed for deriving a measure of the phase shift in the oscillatory wave in its traversal of the cavity resonator for use as a control voltage for modifying the characteristics of the oscillatory loop whereby this phase shift is minimized. For example, the previously identified Ring application discloses a double detection system in which the phase detection is done at low frequencies.

Additionally, various forms of servo systems will be possible for translating control voltages derived by the phase comparison circuit into remedial action. For example, for increased speed of control, it may be preferable to use a completely electronic system, dispensing with the motor, for making the corrective changes in the oscillatory loop.

What is claimed is:

1. In combination, an amplifying element having input and output terminals, means forming a regenerative feedback path between said output and input terminals for forming with said amplifying element a closed oscillatory loop including a high-Q resonant means serially connected therein which is tuned to a desired frequency of oscillation, means for deriving a measure of the phase shift of the oscillatory wave in said loop in its traversal through said resonant means, and means for utilizing said measure to vary the oscillatory frequency whereby said phase shift is minimized.

2. In combination, an amplifying element having input and output terminals, means forming a regenerative feedback path between said output and input terminals for forming with said amplifying element a closed oscillatory loop including a cavity resonator serially connected therein which is tuned to the desired oscillatory frequency, phase comparing means for detecting any phase shift in the oscillatory wave in its traversal through said cavity resonator for deriving a control voltage corresponding thereto, and means for utilizing said control voltage for varying the electrical length of the oscillatory loop whereby the oscillatory frequency is changed in a direction to minimize said phase shift.

3. In combination, an amplifying element having input and output terminals, a cavity resonator having input and output terminals, first means connecting the output terminal of said amplifying element to the input terminal of said cavity resonator, second means connecting the output terminal of said cavity resonator to the input terminal of said amplifying element, the amplifying element, the cavity resonator and the first and second connecting means forming a closed oscillatory loop, means for sampling the wave set up in said oscillatory loop at a region along said first connecting means and at a region along said second connecting means, means for comparing the phases of the two samples for obtaining a measure of the phase shift through said cavity resonator, and means for varying the electrical length of a portion of said oscillatory loop for varying the frequency of the oscillatory wave.

4. In combination, means forming a closed oscillatory wave loop including an amplifying element and a cavity resonator serially connected, phase detecting means for deriving a measure of the phase shift of the oscillatory wave in its traversal through said cavity resonator, and means for utilizing said measure to vary the electrical length of the amplifying element for varying the frequency of the oscillatory wave.

5. In combination, a traveling wave amplifier comprising an interaction circuit which is a slow wave guiding path, means for forming an electron beam for travel past said interaction circuit, means for controlling the velocity of the electron beam past said interaction circuit, and input and output connections to said interaction circuit, means forming a regenerative feedback path between said output and input connections for forming an oscillatory loop including a high-Q cavity resonator tuned to a desired frequency of oscillations, means for deriving a measure of the phase shift of the oscillatory wave in its traversal through said cavity resonator, and means for utilizing this measure to vary the beam velocity control means of said traveling wave amplifier for varying the frequency of oscillations in a direction to minimize said phase shift.

6. In combination, a traveling wave amplifier having means forming a wave guiding path, means for forming an electron beam for passage past said wave guiding path, and means for controlling the velocity of the beam past said wave guiding path, means forming with the wave guiding path of said tube a closed oscillatory loop including as a portion thereof a high-Q cavity resonator tuned to a desired frequency of oscillations, means for detecting the phase shift of the oscillatory wave across said cavity resonator and deriving a control voltage corresponding thereto, and means for utilizing said control voltage for varying the beam velocity control means of said amplifier to modify the electrical length of the wave guiding path thereof for shifting the oscillatory frequency towards the resonant frequency of said cavity resonator.

References Cited in the file of this patent

UNITED STATES PATENTS

| | | |
|---|---|---|
| 2,521,760 | Starr | Sept. 12, 1950 |
| 2,562,958 | Smullin et al. | Aug. 7, 1951 |
| 2,580,007 | Dohler et al. | Dec. 25, 1951 |
| 2,591,257 | Hershberger | Apr. 1, 1952 |
| 2,591,258 | Hershberger | Apr. 1, 1952 |

FOREIGN PATENTS

| | | |
|---|---|---|
| 673,033 | Great Britain | May 28, 1952 |